Jan. 26, 1926.
W. N. RUMELY
1,570,709
COMBINED THRASHER AND HULLER
Filed Jan. 27, 1923
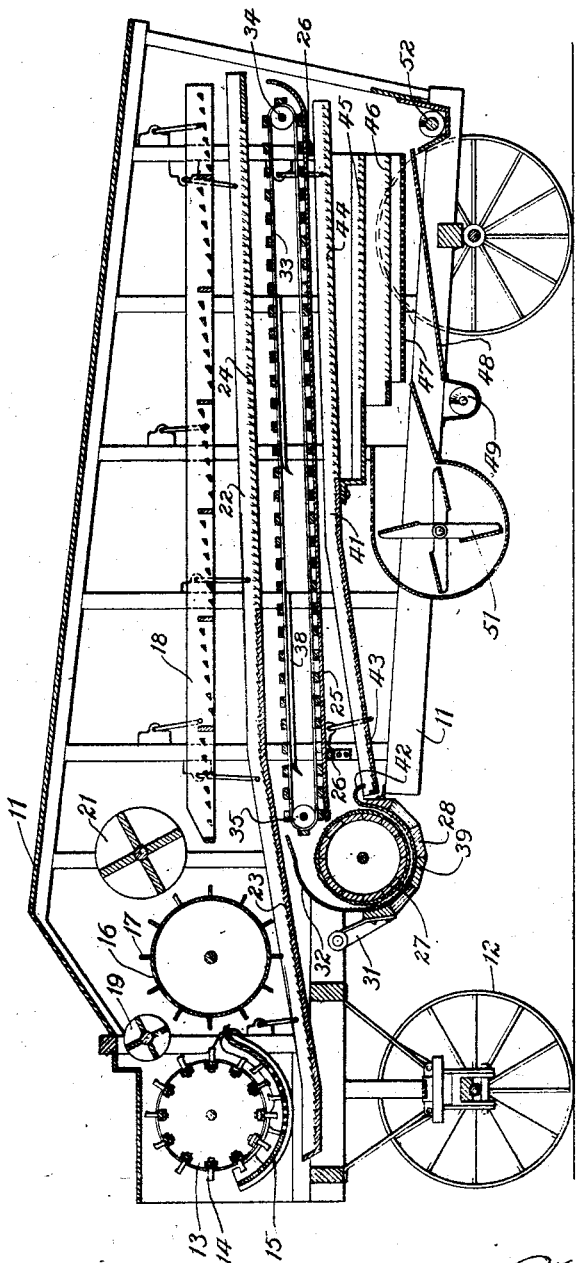
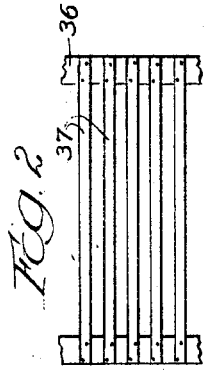
Inventor
William N. Rumely
by Munday, Clarke & Carpenter
Attys.

Patented Jan. 26, 1926.

1,570,709

UNITED STATES PATENT OFFICE.

WILLIAM N. RUMELY, OF CHICAGO, ILLINOIS.

COMBINED THRASHER AND HULLER.

Application filed January 27, 1923. Serial No. 615,208.

*To all whom it may concern:*

Be it known that I, WILLIAM N. RUMELY, a citizen of the United States, residing in Chicago, in the county of Cook and State of Illinois, have invented a new and useful Improvement in Combined Thrashers and Hullers, of which the following is a specification.

My present invention relates to combined thrashing and hulling machines of the general type shown in prior patent numbered 1,026,288 and 1,177,812, issued respectively on January 26, 1915, and April 4, 1916, to me as co-patentee with W. C. Robby.

An important object of the invention is the provision of a modification in that part of the mechanism which enables the machine to be used interchangeably as a thrasher or huller and, though the present construction may or may not be preferred to that of the patents referred to, it is believed to be entirely practicable and to present patentable novelties. Said modification may be said to consist, generally, of the provision of a floor member with means to direct material to be hulled thereover to the hulling mechanism, said floor being completely removable to permit handling of grain without its being passed through the hulling mechanism when the apparatus is used merely as a thrasher.

A further object is the provision of a combined thrasher and huller, which, while thoroughly efficient, is of simplified form involving a minimum of parts and being unlikely to require frequent repair or replacement.

Another object is the provision, in an apparatus of this character, of improved means for transferring the material to be thrashed from the thrashing cylinder to a straw rack, from which it is directed through suitable chaffers and cleaning means, and through the hulling mechanism in the event that the material is of the character requiring hulling.

Other objects and advantages of the invention will be apparent as it is better understood from the following description, which, taken in connection with the accompanying drawings, discloses a preferred embodiment thereof.

Referring to the drawings,

Figure 1 is a longitudinal sectional view of a combined thrasher and huller in which my invention is embodied; and Fig. 2 is a detail view of a portion of the conveyer by which material to be hulled, such as clover, or alfalfa, is directed across the removable floor to the hulling mechanism.

The apparatus as thus illustrated comprises primarily a frame 11, which is mounted upon traction wheels 12 and contains the thrashing and hulling mechanism to be hereinafter described in detail.

The material is first fed to a thrashing cylinder 13, mounted in the front end of the machine and provided with teeth, or flights, 14. Beneath said cylinder, there is provided a concave member 15 and from this member, the material is directed by the cylinder 13 to a transfer cylinder 16, the latter being provided with flights 17 adapted to carry the material upward from said concave member and toward a straw rack 18. A wing beater 19 is positioned between and slightly above the cylinders 13 and 16, and a second larger beater 21 is arranged between the cylinder 16 and the rack 18, these beaters serving, in conjunction with the cylinder 16, to direct the material onto said rack. The rack 18 is reciprocated by any usual or preferred means and the chaff and grain fall therethrough onto a chaffer 22, the latter having a downwardly inclined floor portion 23 at the forward end thereof extending beneath the cylinder 16 and the concave 15. Said chaffer 22 is provided at the rear with a chaffer section 24, which may be adjustably supported from the frame and through which the grain, or other material, is directed by reciprocation of the chaffer 22.

Beneath said chaffer is a floor 25, which is supported upon cross members 26 and is adapted to be inserted or withdrawn at will. Inasmuch as the rear end of the frame is open, it will be obvious that this floor can be bodily removed or positioned from the rear and may rest merely upon the cross members 26, or be positioned between any preferred form of guides provided upon the side uprights shown in the drawings. Beneath and at the forward end of said floor is a rasp cylinder 27 which cooperates with a concave member 28 to hull clover, alfalfa, or the like, when the apparatus is used as a huller. Said concave is suspended from the machine by a bracket 31, and a guide 32 is arranged on the interior of said concave extending above the cylinder 27 in spaced relationship thereto. A conveyer 33 is directed around sprockets 34 and 35 which may be suitably driven from the power mechanism of the machine. Said conveyer comprises side belts 36 and cross slats 37, which latter are moved across the surface of the floor 25 when the conveyer is operated to direct material to be hulled to the rasp cylinder 27. The upper portion of the conveyer is supported upon guides 38, which may be suitably secured to the frame 11. It will be observed that the upper end of the guide 32 is positioned to direct the material from the floor 25 into the space between the rasp cylinder 27 and said guide. The inner surface of said guide is reticulated, as shown at 39, and this surface, with the corresponding surface of the cylinder, serves to hull the clover, or like material, which is fed thereto.

A second chaffer 41 is provided beneath the floor 25 and extends forwardly and downwardly to position adjacent the concave 28. The end of the guide at the rear of the cylinder 27 is curved at 42 over the forward end 43 of the chaffer 41 and serves to direct the hulled material onto said chaffer. A chaffer section 44 which, like the chaffer section 22, may be adjustably supported from the frame is provided at the rear of the chaffer 41, and secured to said chaffer is a third chaffer section 45. A cleaning shoe 46 is disposed beneath the chaffer 45 and a sieve 47 beneath said shoe, these parts being reciprocated with the chaffer 41.

When it is desired to use the apparatus as a thrasher, the floor 25 may be completely withdrawn, which permits the grain to fall through the successive chaffers and through the sieve 47 onto a bottom floor 48, from which it is directed to a main auger 49, which removes it from the machine. A fan 51, of usual construction and arrangement, is employed, being positioned forwardly of the cleaner 46, and a tailing auger 52 is provided at the rear of the machine, by which the tailings are carried off.

If, on the other hand, it is desired to use the machine as a huller, the floor 25 may be inserted and the conveyer 33 operated, in which event the material is directed, after passing through the chaffer section 24, to the hulling mechanism, from which it is delivered onto the forward end of the chaffer 41. Operation of this chaffer serves to direct the hulled material rearwardly and through the chaffer section 44, the remainder of the course being the same as for the grain as heretofore described.

It is thought that the invention and many of its attendant advantages will be understood from the foregoing description, and it will be apparent that various changes may be made in the form, construction and arrangement of the parts without departing from the spirit and scope of the invention, or sacrificing all of its material advantages, the form hereinbefore described being merely a preferred embodiment thereof.

I claim:

1. In a combined thrasher and huller, the combination of a thrashing cylinder, a straw rack, a chaffer beneath said rack, hulling mechanism, and a return floor interposed between said chaffer and hulling mechanism, said floor extending from one end of said chaffer to said hulling mechanism and being completely removable to prevent delivery of material to the hulling mechanism when it is desired to use the apparatus merely as a thrasher.

2. In a combined thrasher and huller, the combination of a thrashing cylinder, a chaffer, hulling mechanism, and means upon which material to be hulled is directed from said chaffer to said hulling mechanism, said means extending substantially throughout the length of the portion of the chaffer through which the material passes and terminating at a point to deliver the material to said hulling mechanism, said means being completely removable to permit grain to be ejected from the apparatus without passing through said hulling mechanism when the apparatus is used merely as a thrasher.

3. In a combined thrasher and huller, the combination of a thrasher cylinder, a chaffing device, means for ejecting chaffed grain after passing through said device, hulling mechanism disposed out of the normal path of the grain through said chaffing device, and a removable floor adapted to be positioned to receive the material to be hulled directly from said chaffing device and to direct the same to the hulling mechanism when it is desired to use the apparatus as a huller.

4. In a combined thrasher and huller, the combination of a rack, a chaffer below said rack, hulling mechanism below the chaffer, a sieve, a device for ejecting the separated grain and hulled clover, alfalfa and the like out of said thrasher and huller, and a member upon which unhulled clover and alfalfa may be directed to said hulling mechanism, said member being completely removable to permit separated grain to be directed to said ejecting device without passing through the hulling mechanism, said member being disposed beneath the portion of said chaffer through which the material passes and extending substantially to said hulling mechanism.

5. In a combined thrasher and huller, the combination of a thrashing mechanism, a chaffer adapted to receive material being thrashed from said mechanism, a hulling mechanism, means comprising a floor and a conveyer movable thereon for directing material to be hulled to said hulling mechanism, means for further chaffing and cleaning the material, and a device for ejecting the thrashed material, said floor being removable to permit passage of separated grain through the apparatus without passing through said hulling mechanism, said floor being disposed beneath the portion of said chaffer through which the material passes and extending substantially to said hulling mechanism.

6. In a combined thrasher and huller, the combination of a thrashing cylinder and concave associated therewith, a straw rack, means for transferring material being thrashed from said cylinder to said rack, a chaffer beneath the rack and having its forward end extending beneath said cylinder and concave, a second chaffer disposed beneath said first-mentioned chaffer, a device for ejecting thrashed or hulled material from the machine, hulling mechanism disposed out of the path of the separated grain through said chaffers, an ejecting device, a removable floor adapted to be positioned between said chaffers to direct material to be hulled to said hulling mechanism when it is desired to use the machine as a huller, said floor being disposed beneath the portion of said chaffer through which the material passes and extending substantially to said hulling mechanism, and means for directing the hulled material from said hulling mechanism through said second-mentioned chaffer to the ejecting device.

7. In a combined thrasher and huller, the combination of a thrashing cylinder and concave associated therewith, a straw rack, a transfer cylinder for directing the material from said thrashing cylinder to said rack, chaffing devices beneath said rack, and means for directing the thrashed and chaffed material from the apparatus.

8. In a combined thrasher and huller, the combination of a thrashing cylinder and concave associated therewith, a straw rack, a transfer cylinder adapted to transfer the material being thrashed from said thrashing cylinder to said rack, a chaffer beneath said rack having its forward end extended beneath said cylinders, means for further chaffing and cleaning the material, and devices for ejecting the thrashed material from the apparatus.

9. In a combined thrasher and huller, the combination of a thrashing cylinder and concave associated therewith, a straw rack, a transfer cylinder for directing material being thrashed from said thrashing cylinder to said rack, chaffing means beneath said rack, a hulling mechanism disposed out of the path of grain moving through said chaffing means, and a removable member adapted to be inserted to direct the material from said chaffing means to said hulling mechanism when it is desired to use the apparatus as a huller.

WILLIAM N. RUMELY.